L. F. BOWERS.
DRIVING MECHANISM.
APPLICATION FILED MAR. 14, 1914.
1,196,425.
Patented Aug. 29, 1916.
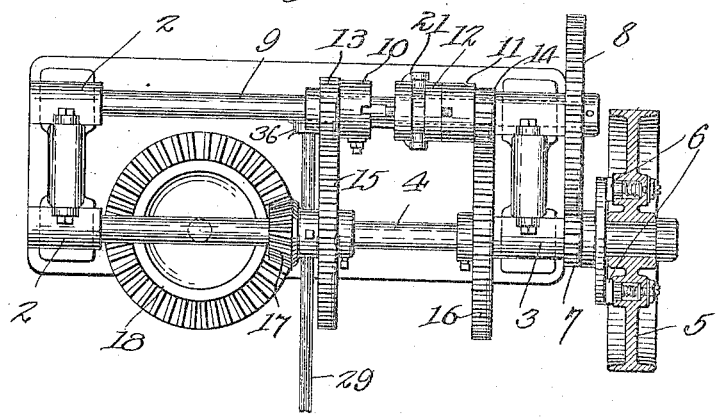
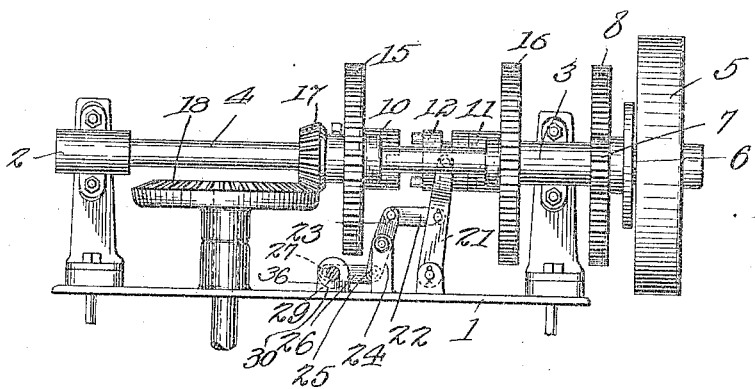
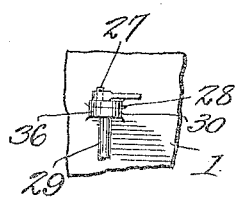
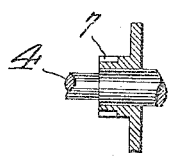
Lionel F. Bowers,
Inventor,
by Cashow & Co.
Attorneys.
Witnesses

UNITED STATES PATENT OFFICE.

LIONEL FRANCIS BOWERS, OF COLUMBIA, PENNSYLVANIA.

DRIVING MECHANISM.

1,196,425.  Specification of Letters Patent.  Patented Aug. 29, 1916.

Application filed March 14, 1914. Serial No. 824,764.

*To all whom it may concern:*

Be it known that I, LIONEL F. BOWERS, a citizen of the United States, residing at Columbia, in the county of Lancaster and State of Pennsylvania, have invented a new and useful Driving Mechanism, of which the following is a specification.

The present invention relates to improvements in driving mechanisms. One object of the invention being the provision of a driving mechanism in which the driving means are loosely mounted on the driven shaft, means being provided on a counter shaft adjacent said driven shaft whereby the driven shaft is driven at two different speeds through said loosely mounted means, and in turn drives the mechanism to which it is desired to transmit power.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a top plan view of the complete mechanism. Fig. 2 is a side elevation thereof. Fig. 3 is a detail view of the operating shaft's mounting. Fig. 4 is a detail view of the clutch actuated member.

Referring to the drawings, the numeral 1 designates the base or support, which is provided with the double bracket bearings or standards 2 and 3. The driven shaft 4 is mounted in these bearings and has freely rotatable thereon the pulley 5, which through the friction clutch 6, as clearly illustrated in Fig. 1, transmits motion to the gear 7. The gear 7 is loosely mounted upon the drive shaft 4, and meshes with the gear 8 mounted upon the counter shaft 9, power being transmitted from the pulley 5 through the friction clutch 6 to the gear 7, which in turn drives the gear 8 and consequently the counter shaft 9. Two sleeves 10 and 11 are loosely mounted upon the shaft 9 and are adapted to be alternately locked to the shaft by the sliding clutch 12, the detail operation of which will be presently set forth. The gears 13 and 14 mounted on the above sleeves, are arranged to mesh with the gears 15 and 16, the latter gears being fixed upon the shaft 4 to which the pinion or gear 17 is also fixed. As shown, the pinion 17 meshes with the large gear 18 which drives through the shaft 19, the conveyer mechanism (not shown). The pinions or gears 13 and 14 are of different sizes, the pinion 14 being the smaller of the two. It will thus be seen that by locking the respective pinions 13 and 14 to the shaft 9, either of the same will transmit motion to the shaft 4 through either of the gears 15 or 16. By this construction and arrangement of parts, it is evident that the conveyer operating gear may be operated at two speeds with the present mechanism.

The slidably mounted clutch member 12 of the present device which is keyed upon the shaft 9 is operated by means of the rocking lever 21 pivotally connected to the base 1, as clearly shown in Fig. 2. A link 22 is operably connected to the rocking lever 21 an arm 23 being connected to the link 2. The arm is swingingly mounted in the support 24 as the lower terminal 25 thereof is connected to the link 26 which is eccentrically connected by means of the pin 27 to the disk 28. This disk 28 is keyed upon one end of a shaft 29 journaled in the lug 30 upon the base 1, the shaft 29 being operated either by rotation or oscillation to actuate the link 26 and consequently select either one of the respective gears 13 and 14 for operating the driven shaft 4.

By constructing the standards 2 and 3 as illustrated, both of the shafts 4 and 9 are properly journaled and spaced relative to each other, and the base 1 thus carries both shafts and maintains them in proper parallel relation.

From the foregoing description, it is evident that when the pulley 5 is operated, motion is transmitted through the clutch 6 to the gear 7, said gear 7 being freely rotatable upon the end of the shaft 4, that the gear 8 will be properly rotated and thus transmit motion to the shaft 9.

When the slidable clutch member 12 is in neutral or central position, no motion will be transmitted to the shaft 4, but when the yoked lever 21 is operated as for instance to assume the position as shown in Figs. 1 and 2, the smaller gear 14 will be directly connected to the shaft 9, so that the same will be rotated and thus transmit motion at a slower speed to the driven shaft 4 and consequently the conveyer actuating gear. In order to operate the shaft 4 at a greater rate of speed, the clutch member 12 is thrown in the opposite direction to connect the gear 13 connected to the shaft 9, the gear 13 being larger than the gear 14 and consequently operating the shaft 4 at a greater speed. By mounting the shaft 29 for rotation from the desired conveyer mechanism, it is evident that the same may be rotated to properly throw the clutch member 12 to impart the two different speeds to such conveyer mechanism, the actuation through the shaft 29 being entirely automatic.

What is claimed is:

A transmission mechanism including a base, having a pair of brackets, two parallel shafts journaled in said brackets, a pulley freely rotatable upon one shaft, a gear loosely mounted on said shaft, a friction clutch between said pulley and gear, a gear upon the other shaft and meshing with said gear, a pair of gears of different diameters mounted loosely upon the second mentioned shaft and having clutch portions, a clutch member slidable upon the second mentioned shaft between the said pair of gears to engage one or the other of said clutch portions, means for shifting said clutch member, a pair of gears secured upon the first mentioned shaft and meshing with said pair of gears, a pinion carried by one of the last mentioned pair of gears, and a gear carried by the base and meshing with said pinion.

In testimony that I claim the foregoing as my own, I have hereto affixed my signature in the presence of two witnesses.

LIONEL FRANCIS BOWERS.

Witnesses:
 FRANK H. WEIGEL,
 HAROLD M. WEISHAUPT.

Copies of this patent may be obtained for five cents each, by addressing the "Commissioner of Patents, Washington, D. C."